United States Patent [19]
Janischewski et al.

[11] Patent Number: 6,048,926
[45] Date of Patent: *Apr. 11, 2000

[54] AQUEOUS TWO COMPONENT POLYURETHANE COATINGS, PREPARATION THEREOF AND USE THEREOF

[75] Inventors: Klaus Janischewski; Dirk Reichel, both of Dorsten, Germany

[73] Assignee: Huels Aktiengesellschaft, Marl, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/959,655

[22] Filed: Oct. 28, 1997

[30] Foreign Application Priority Data

Oct. 31, 1996 [DE] Germany .................... 196 44 044

[51] Int. Cl.$^7$ ............. C08J 3/00; C08K 3/20; C08L 75/00; C09K 3/00
[52] U.S. Cl. .............. 524/591; 252/182.2; 427/372.2; 427/385.5; 524/839; 524/840
[58] Field of Search ............... 524/591, 839, 524/840; 427/372.2, 385.5; 252/182.2

[56] References Cited

U.S. PATENT DOCUMENTS

| | | | |
|---|---|---|---|
| 5,075,370 | 12/1991 | Kubitza et al. | 524/591 |
| 5,705,557 | 1/1998 | Lange et al. | 524/591 |

FOREIGN PATENT DOCUMENTS

| | | |
|---|---|---|
| 0 358 979 | 3/1990 | European Pat. Off. . |
| 0 548 669 | 6/1993 | European Pat. Off. . |
| 0 554 747 | 8/1993 | European Pat. Off. . |
| 0 583 728 | 2/1994 | European Pat. Off. . |
| 0 669 352 | 8/1995 | European Pat. Off. . |
| WO 96/18668 | 6/1996 | WIPO . |

*Primary Examiner*—Patrick D. Niland
*Attorney, Agent, or Firm*—Oblon, Spivak, McClelland, Maier & Neustadt, P.C.

[57] ABSTRACT

A composition containing an unblocked monomeric diisocyanate finely dispersed an aqueous dispersion of at least one organic polyhydroxy compound. The composition may be used to prepare aqueously disperse two component polyurethane coatings where the diisocyanate functions as a curing agent and the polyhydroxy compound serves as a binder agent. In the composition, the ratio of hydroxyl groups in the polyhydroxy compound to the isocyanate groups in the diisocyanate is 0 5:1 to 5:1. The composition may be used to apply polyurethane coatings to substrates.

24 Claims, No Drawings

AQUEOUS TWO COMPONENT POLYURETHANE COATINGS, PREPARATION THEREOF AND USE THEREOF

BACKGROUND OF THE INVENTION

1. Field of the Invention

The present invention relates to a composition containing an aqueous dispersion of at least one organic polyhydroxy compound as a binder component and at least one monomeric diisocyanate dispersed in the dispersion of the polyhydroxy compound as a curing component, which may be used to make polyurethane coatings. A major advantage of the present invention is that the composition may be used to prepared virtually solvent-free. The invention also relates to applying polyurethane coatings to substrates using the composition.

2. Description of the Related Art

Waterborne coating systems are becoming increasingly important for both economic and ecological reasons. In chemically crosslinking two component polyurethane coatings, compounds which contain free isocyanate groups ("polyisocyanates") act as a curing agent for a binder, which is generally an organic polymer having NCO-reactive groups. Examples of binders include polyacrylatepolyols, polyetherpolyols and polyesterpolyols. These coating systems are of great importance because of the excellent properties of the finishes they produce. Until recently, organic solvents were indispensable in making these coatings. The use of water appeared not to be possible for a long time, since isocyanate groups are known to react, not only, as desired, with the organically attached NCO-reactive groups (such as hydroxyl groups) of the binder, but also, undesirably, with water. This gives rise to urea structures and produces carbon dioxide. The undesired reaction with water leads to (1) a reduced crosslink density in the cured finish and (2) foaming as a consequence of the carbon dioxide evolution, both of which are disadvantageous with respect to producing the coating as well as to the optical properties of the finishes. Altogether, such waterborne systems appeared to be impractical because of too short a pot life (or processing time) and unsatisfactory properties of the finishes.

The hydrolysis of isocyanate groups can be prevented by blocking (or capping) them. For this, the free polyisocyanates are reacted with blocking agents, such as secondary or tertiary alcohols; lactams (for example $\epsilon$-caprolactam); or oximes (for example methyl ethyl ketoxime). The blocked polyisocyanates are stable at room temperature and at moderately elevated temperatures and can be mixed with the binder to form waterborne one component coatings. At the curing temperatures of the coatings, the blocking agent is detached, and the free isocyanate groups then react with the reactive groups, usually hydroxyl groups, of the binder to crosslink the chains. It is true that blocked isocyanates avoid the problems associated with the hydrolysis of the isocyanate groups. However, the blocking process adds an additional processing step and requires appreciably higher curing temperatures. Also, curing blocked isocyanates releases a blocking agent which may not necessarily be dischargeable into the environment.

There was, therefore, still a need for a waterborne two component polyurethane coating system featuring a curing agent containing free isocyanate groups. According to DE 27 08 422 and DE 35 29 249, organic di or polyisocyanates are added to polymer dispersions to improve the property spectrum. However, the dispersed polymers are not organic polyhydroxy compounds, as customary in polyurethane chemistry as reaction partners for polyisocyanates, but, instead, substances which are inert toward isocyanate groups. The property-improving effect is therefore based, not on chemical crosslinking, but on the dispersed polymer becoming sheathed with the polyurea compound formed from the reaction of the isocyanate with water.

Chemically crosslinking aqueous two component polyurethane coatings containing free polyisocyanates as the curing agent for the binder were apparently described for the first time in EP 0 358 979. According to this reference, polyhydroxyacrylates used as binder component are capable of emulsifying certain polyisocyanates having free isocyanate groups, known as coating polyisocyanates. The resulting aqueous two component system cures to crosslinked films. The coating polyisocyanates are oligomeric derivatives, containing biuret, urethane, urethdione and/or isocyanurate groups, of readily available monomeric or simple diisocyanates, especially of hexamethylene diisocyanate (HDI), isophorone diisocyanate (IPDI) and/or bis (isocyanatocyclohexyl)methane ($H_{12}$MDI or, in short, HMDI). The coating polyisocyanates used according to EP 0 358 979 have a 23° C. viscosity of up to 1000 mpa.s and an average NCO functionality of 2.2 to 5. Monomeric diisocyanates as sole curing agents are therefore ruled out because of their lower viscosity as well as because of their bifunctionality. But they are even evidently undesirable as ingredients of the mixture, since, according to EP 0 358 979, they are separated from the coating polyisocyanates in a known manner, preferably by distillation, after the coating polyisocyanates have been produced. The coating polyisocyanates, like the aforementioned blocked polyisocyanates, have to be prepared using a separate process step and, what is more, owing to their higher molecular weight, have to be diluted with organic solvents to a suitable application viscosity or rendered self-dispersible via the incorporation of ionic- or nonionic-hydrophilic centers.

Other publications deal mainly with the widening of the field of use for emulsifying binder components and the variation, including through a nonionic-hydrophilic modification by alkoxylation, of the polyisocyanate curing agent components, especially with the goal of lengthening the pot life and of improving the property spectrum of the coatings. Hydrophilically modified polyisocyanates are, however, problematic for use as a curing agent component, since the cured finishes may be water-sensitive because of the hydrophilic groups which are still present. Examples of binder variations and/or the use of hydrophilic modified polyisocyanates are found in DE 41 01 696, 41 35 571, 42 26 270, 43 17 791, 43 22 242 and 43 26 670 and also in EP 0 469 389, 0 496 205, 0 542 085, 0 543 228, 0 562 436 and 0 583 728. Specifically, the preparation of hydrophilic modified polyisocyanates for use in aqueously disperse two component polyurethane systems is discussed in EP 0 206 059, 0 516 277, 0 540 985, 0 548 669, 0 645 410, 0 680 983 and 0 703 255, among others.

The isocyanate curing agents which are predominantly used and produced on an industrial scale for aqueous two component polyurethane systems generally have an average NCO functionality which is within the range of 2.2 to 5, as specified in EP 0 358 979. They are typically used to produce waterborne clear coating systems having a solids content of 40 to 50% by weight. However, these coating systems have the disadvantage of customarily containing, in the ready-to-use formulation, organic solvents in minimum quantities of 10 to 20% by weight, since this is necessary for optimum processing and to achieve the desired coating property profile. Aqueously disperse two component polyurethane coating systems comprising monomeric diisocyanates and an amount of organic solvents <1% by weight, based on the solids content, have hitherto not been explicitly described, nor are they are commercially available. It is true that the use of monomeric diisocyanates as curing agents is explicitly or implicitly mentioned in a number of patent documents (for example in EP 0 562 436, EP 0 583 728, DE 43 26 670 and DE 42 26 270), but the examples always feature an organic solvent in amounts of 10 to 20% by weight in the ready-to-use formulation.

SUMMARY OF THE INVENTION

One aspect of the invention is an aqueously disperse two component composition containing:

(A) an aqueous dispersion of at least one organic polyhydroxy compound, and (B) at least one unblocked monomeric diisocyanate finely dispersed in the dispersion, wherein ratio of the hydroxyl groups in the polyhydroxy compound to the isocyanate groups in the diisocyanate is 0.5:1 to 5:1.

Another aspect of the invention is a process for making an aqueous composition that may be used to prepare two component polyurethane coatings by finely dispersing at least one unblocked monomeric diisocyanate (a curing agent component) in at least one water-dispersed organic polyhydroxy compound (which serves as a binder component), where the ratio of hydroxyl groups to isocyanate groups is as defined above.

The invention further provides for the use of these compositions for applying a polyurethane coating to substrates.

DETAILED DESCRIPTION OF THE INVENTION

The coating systems of the invention have a processing time, i.e., pot life, which is limited, but adequate for most practical requirements. The processing time may be, at room temperature, from 2 to 12 hours. Within this time, the level of free isocyanate groups does not decrease appreciably, and the viscosity of the dispersion of binder component A with the curing agent component B finely dispersed therein does not increase significantly. The crosslink density and hence the finish properties remain virtually unchanged. During the storage and processing of the coating system, no troublesome evolution of carbon dioxide takes place. In addition, the organic solvent content may be lower than 1% by weight, based on the solids content of the dispersion. The coating systems of the invention are not inferior to those of the prior art in terms of processing methods and properties of the cured film.

Surprisingly, neither the comparatively costly hydrophilicized coating polyisocyanates have to be used, nor do the isocyanate groups need to be blocked, to obtain this favorable property spectrum of the coating systems according to the invention. On the contrary, the unblocked, non-hydrophilic-modified monomeric (or simple) diisocyanates which are customarily in solvent-containing two component systems may be used, provided that they are sufficiently finely dispersed in the aqueous dispersion of the coating resin, advantageously through the action of high shearing forces. The good paint properties of the coatings are not impaired as a result. This is surprising, since it should have been expected that the fine dispersion of the diisocyanates would lead to an increased hydrolysis with the formation of unacceptable quantities of monofunctional isocyanates. Monofunctional isocyanates do not contribute to the crosslinking of the binder molecules and they therefore lower the quality of the coating.

Organic Polyhydroxy Compound

Many types of organic polyhydroxy compounds, i.e., polyols, may be used in the present invention. These compounds have at least two hydroxyl groups per molecule. The hydrophilic, water-thinnable systems, i.e., water-dispersed polyhydroxy compounds (polyols), customary for two component coatings can be used as binder component A, either alone or in the form of a mixture of two or more compounds. Depending on the molecular weight and the degree of hydrophilicity, the binder components A may be dispersed with average particle sizes of >0.1 $\mu$m, are colloidally dispersed (with average particles sizes within the range from 10 to 100 nm) or else form a molecular dispersion (with average particle sizes of <10 nm). In general, all three particle size ranges may be present at any one time. At any rate, binder component A has to be water-thinnable as a dispersion or as a colloidally to molecularly disperse "solution". The aqueous "solution" or dispersion preferably has a solids content of 15 to 55% by weight, a 23° C. viscosity of 10 to 10,000 mpa.s and a pH of 6 to 9.

The binder components A can be known addition-polymerization, polycondensation or polyaddition resins, such as polyacrylate resins, polyester resins and polyurethane resins. Mixtures of more than one resin from the same or different classes are also suitable. The molecular weight can vary widely; for example, the number-average molecular weight (Mn) can be 1000 to 100,000, preferably 2000 to 20,000. The resins can be linear or branched. The water thinnability of these resins and the stability of the diluted solutions or dispersions is generally based on the presence of ionically hydrophilic groups, such as carboxylate, sulfonate or quaternary ammonium groups, formed from potentially ionically hydrophilic groups, such as carboxylic acid, sulfonic acid or tertiary amino groups, by neutralization. The potentially ionic carboxyl groups are preferably not completely neutralized, so that the resins preferably have acid numbers between 20 and 100 mg of KOH/g. Of course, the hydroxyl groups required for the reaction with the isocyanate groups of curing agent component B also contribute to the hydrophilicity of binder component A and hence to the water thinnability. In addition to the hydroxyl groups, additional hydrophilicizing groups may be present in the molecule, for example polyoxyalkylene groups, and also further groups which can react with isocyanate groups, such as pendant amino, imino, mercapto or acidic-CH groups, such as malonic acid derivatives. Preferred binder components A have hydroxyl numbers of 50 to 300, more preferably 100 to 200.

The dispersions of binder component A can contain other water thinnable organic polyhydroxy compounds which are compatible with the respective binder component A, such as water-soluble, optionally oxyalkylene-containing alcohols having more than two hydroxyl groups, such as glyercol, trimethylolethane, trimethylolpropane, 1,2,4-butanetriol, 1,2,6-hexanetriol and pentaerythritol and also the ethoxylation and/or propoxylation products of these alcohols. These materials may be used to modify the properties of the cured finish and adapt them to specific requirements.

The aqueously disperse binder components A can be prepared according to known methods, for example by a melt emulsification process or by the acetone process. In the latter process, for example, the starting point can be an as-polymerized solution of a carboxyl-functional binder component A, for example a polyacrylate resin, in acetone. The solution may initially be mixed with a neutralizing agent. Suitable neutralizing agents are inorganic or organic bases, especially volatile tertiary amines, such as triethylamine or N, N-dimethylethanolamine. It is advantageous not to neutralize all the carboxyl groups; on the contrary, the degree of neutralization is generally between 50 and 100%, so that the acid numbers of the partly neutralized binder components A are below 80 mg of KOH/g. High degrees of neutralization lead to highly viscous dispersions, especially in the case of binder components A having a high carboxyl functionality, so that the solids content would have to be reduced to obtain handleable dispersions. In such cases, it is advisable to employ a partial neutralization which results in dispersions having a usable viscosity and an acceptable solids content.

After neutralization, demineralized water is added to the acetone solution. Alternatively, however, a mixture of water and neutralizing agent can be added to the binder solution, the binder solution can be added to a mixture of water and neutralizing agent, or a mixture of binder solution and neutralizing agent may be added to water. High shearing forces are usually not necessary, but they do, if desired, make possible a fine distribution of the disperse phase of binder component A in the continuous aqueous-organic phase. High speed stirrers, dissolvers or rotor/stator mixers can also be used, for example. This is followed by a distillation at a higher temperature, such as 40 to 90° C., and if necessary under reduced pressure at the end, and also advantageously under shearing, to remove the acetone to a substantial extent for possible re-use in a new polymerization batch. This provides storage stable binder dispersions having solids contents of 15 to 55% by weight and solvent residue contents which may be <1% by weight, including <0.1, <0.2, <0.5 and <0.8% by weight, based on the solids content. Of course, the organic solvent content may be higher, but, preferably, the solvent content is less than 10% by weight, based on the solids content. The maximum solvent content of the composition is preferably at most 8% by weight, even more preferably at most 5% by weight, still more preferably at most 2% by weight and, most preferably, at most 1% by weight, based on the solids content of the dispersion. These amounts of solvent apply also the composition after adding isocyanate (B) as described below, as well as to the organic solvent content of the diisocyanate itself. These dispersions can be used directly, or, after appropriate dilution with water, if desired together with other, compatible binders, which can be added to the finished dispersion or else to the acetone solution prior to the dispersing step.

Monomeric Diisocyanate

It is an essential feature of the invention that the curing agent component B is a monomeric, non-blocked and non-hydrophilically-modified diisocyanate which is customarily used in coating technology. It is accordingly selected from diisocyanates having aliphatically, cycloaliphatically, araliphatically and/or aromatically attached isocyanate groups, which preferably have a viscosity of up to 50 mpa.s at 23° C. and therefore are easy to incorporate into binder component A, without the use of organic solvents. Particularly suitable diisocyanates are diisocyantes having aliphatically and/or cycloaliphatically attached isocyanate groups, such as hexamethylene diisocyanate (HDI), bis(isocyanatocyclohexyl)methane (HMDI), 2-methylpentane diisocyanate, 1,6-diisocyanato-2,2,4- and/or -2,4,4-trimethylhexane and, especially, 3-isocyanatomethyl-3,5,5-trimethylcyclohexyl isocyanate (IPDI). It is also possible to use, although less preferably, diisocyanates having aromatically attached isocyanate groups, such as 2,4-diisocyanatotoluene (TDI), 4,4'-diisocyanatodiphenylmethane (MDI) or the corresponding technical grade mixtures with their homologs and isomers. It is, of course, also possible to use mixtures of a plurality of the monomeric diisocyanates mentioned.

Surprisingly, when the coatings cure, no significant loss of monomeric diisocyanates occurs, despite the lower molecular weight, compared with the coating polyisocyanates. The crosslink density of the cured coatings thus meet expectations, and workplace and environmental impact due to diisocyanates is kept to a minimum when workplace safety and environmental protection regulations are fully complied with.

Preparation of the Coatings

To prepare the ready-to-use coatings, curing agent component B is emulsified in a dispersion of binder component A shortly before the processing of the coating, where the dispersion of binder component A may act as an emulsifier for the diisocyanates. At any rate, no additional emulsifier is required, although there are cases where it may be helpful. The two components can be mixed by simply stirring at room temperature. It is advantageous to exert strong shearing forces, for example by means of high speed stirrers, dissolvers, vibrators or turbomixers. This provides the desired fine dispersion of curing agent component B in the dispersion of binder component A. It is advantageous for the average particle size of the finely dispersed curing agent component B to be of the same order of magnitude as that of binder component A. The amounts of binder component A and curing agent component B are determined so that the equivalents ratio of the hydroxyl groups in the binder component A to the isocyanate groups in the curing agent component B is preferably within the range from 0.5:1 to 5:1, more preferably within the range from 1:1 to 3:1.

When components A and B are mixed, binder component A appears to protect curing agent component B from the water, whether through diffusion of the diisocyanate into the dispersed particles of binder component A, or through stabilization of the resulting diisocyanate droplets through an emulsifying action of the dispersed polyol particles of binder component A. At any rate, there is no significant loss of diisocyanate due to reaction with water, given appropriate storage and processing of the coating. Consequently, there is no significant evolution of carbon dioxide. After the polyhydroxy compound and the diisocyante are combined to form the composition, it is possible that adducts may form by reaction of a hydroxy group of the polyhydroxy compound with an isocyanate group of the diisocyanate to form a urethane linkage.

The coatings of the invention have the advantage that they can be formulated without addition of external emulsifiers. They are therefore preferably free from external emulsifiers. However, it is also possible, of course, to add customary external emulsifiers in customary or smaller than customary amounts during the formulation. Furthermore, the coatings of the invention may contain other customary auxiliary and additive substances, for example pigments, defoamers, flow agents, thickeners, siccatives, fillers and/or catalysts for the isocyanate addition reaction. These auxiliary and additive substances are not constituents of the coating which are essential to the invention. They are generally located in binder component A and, if used, can be added to it before or after its dispersing. The former will always be advisable when the auxiliary or additive substance in question is not to pass into the aqueous phase.

The solids content of the coatings is generally between 35 and 60 percent by weight, preferably between 40 and 50 percent by weight, and the proportion of water in the coating is accordingly generally within the range from 40 to 65 percent by weight, preferably between 50 and 60 percent by weight. The 23° C. viscosity of the coating is initially, i.e., immediately after mixing of components A and B, within the range from 10 to 1000 mPa.s customarily, preferably within the range from 50 to 500 mPa.s, and the pH is generally between 6 and 9. If the viscosity is too high for the envisioned application process it is readily adjustable to a suitable value by addition of water.

Use of the Coatings

Since the coatings thus prepared contain reactive components, they do have a limited storage life. The pot life/processing time depends on the chemical nature of binder component A and of the curing agent component B. In general, the coatings, stored at room temperature, should be used within 12 hours at the latest, advantageously within 8 hours, of their preparation by mixing components A and B. The coatings are suitable for virtually all fields of application in which solvent-containing or solvent-free coating systems are used to produce high grade coatings on substrates which withstand the necessary curing temperatures. The composition may be applied to the substrates by customary methods, such as spraying, dipping or brushing. The curing temperatures generally range up to about 120° C., preferably 60 to 100° C., and the curing times generally range up to about 45 minutes, preferably 15 to 30 minutes. The resulting finishes are scratch-resistant, solvent-resistant, blister-free and, when clear, transparent. The coatings of the invention are particularly useful for producing top coats on wood, metal and plastic substrates, which are not inferior to the corresponding coatings of the prior art with respect to mechanical properties and resistance to chemicals and environmental effects.

EXAMPLES

Having generally described this invention, a further understanding can be obtained by reference to certain specific examples which are provided herein for purposes of illustration only and are not intended to be limiting unless otherwise specified.

Example 1

A polyacrylate having a hydroxyl number of 130 and an acid number of 40 mg of KOH/g was prepared as a 60 percent strength by weight solution in acetone by the feed stream addition process using 2% by weight of tert-butyl peroctoate as initiator and 2% by weight of dodecyl mercaptan as regulator, each percentage being based on the total amount of acrylates, from 27% by weight of hydroxyethyl acrylate, 46% by weight of n-butyl acrylate, 12% by weight of methyl methacrylate, 5% by weight of acrylic acid and 10% by weight of Tone®M 100 (an ester of hydroxyethyl acrylate and caprolactone). To 1000 g of this solution were added initially 30 g of N,N-dimethylethanolamine and then 1000 g of demineralized water. Acetone was then removed under reduced pressure. This provides an aqueous dispersion having a solid content of 38% by weight. This dispersion was admixed with IPDI to prepare waterborne two component coatings having OH:NCO ratios of 1:1.3, 1:1.5 and 1:1.8. This was accomplished by incorporating 64 g, 739 and 88 g of IPDI into 500.0 g lots of the dispersion by means of a high speed stirrer/dissolver. The coating had a residual solvent content of <1% by weight, based on the solids content, and remained processible within 8 hours of preparation. Coats with a wet thickness of 100 μm cured at 80° C. within 30 to 45 min to shiny bright, hard, elastic and solvent-resistant films.

Example 2

A polyacrylate having a hydroxyl number of 100 and an acid number of 40 mg of KOH/g was prepared as a 60 percent strength by weight solution in acetone by the feed stream addition process using 2% by weight of tert-butyl peroctoate as initiator and 2% by weight of dodecyl mercaptan as regulator, each percentage being based on the total amount of acrylates, from 17% by weight of hydroxyethyl acrylate, 51% by weight of n-butyl acrylate, 17% by weight of methyl methacrylate, 5% by weight of acrylic acid and 10% by weight of Tone®M 100 (an ester of hydroxyethyl acrylate and caprolactone). To 1000 g of this solution was added initially 27 g of trimethylolpropane (to set a total hydroxyl number of 150), then 30 g of N,N-dimethylethanolamine and then 1300 g of demineralized water. Acetone was then removed under reduced pressure. This provided an aqueous dispersion having a solid content of 33% by weight. 280 g of IPDI were incorporated by means of a high speed stirrer/dissolver to obtain a water-thinnable two component polyurethane clear coating having an OH:NCO ratio of 1:1.5 and a residual solvent content of <1% by weight, based on the solids content, the clear coating being processible for 8 hours from preparation. Coats with a wet thickness of 100 μm cured at 80° C. within 30 to 45 min to shiny bright, hard, elastic and solvent-resistant films Example 3

A polyacrylate having a hydroxyl number of 130 and an acid number of 40 mg of KOH/g was prepared as a 60 percent strength by weight solution in acetone by the feed stream addition process using 2% by weight of tert-butyl peroctoate as initiator and 2% by weight of dodecyl mercaptan as regulator, each percentage being based on the total amount of acrylates, from 27% by weight of hydroxyethyl acrylate, 46% by weight of n-butyl acrylate, 12% by weight of methyl methacrylate, 5% by weight of acrylic acid and 10% by weight of Tone®M 100 (an ester of hydroxyethyl acrylate and caprolactone). To 1000 g of this solution were added initially 30 g of N,N-dimethylethanolamine and then 1500 g of demineralized water. Acetone was then removed under reduced pressure. 840 g of titanium dioxide (Kronos®2190) were added and dispersed for about 20 min with a dissolver at a circumferential speed of 12 m/s. This provided a pigmented coating resin dispersion having a pigment volume concentration of 20% by volume. 230 g of IPDI were incorporated by means of a high speed stirrer/dissolver to obtain a white-pigmented, water-thinnable two component polyurethane coating having a residual solvent content of <1% by weight and an OH:CNO ratio of 1:1.5, processible for about 6 hours. Coats having a wet thickness of 100 μm cured at 80° C. within 30 to 45 min to shiny bright, hard, elastic and solvent-resistant films.

Example 4

224 g of a polyester having a hydroxyl number of 108 and an acid number of 21 mg of KOH/g (prepared from an acid component consisting of 86% by weight of isophthalic acid and 14% by weight of trimellitic anhydride and an alcohol component consisting of 64% by weight of 1,6-hexanediol, 21% by weight of trimethylolpropane and 15% by weight of 1,6-trimethylhexanediol) and 56 g of a polyester having a hydroxyl number of 564 (prepared from isophthalic acid and trimethylolpropane in a molar ratio of 1:2) were used to prepare a 60 percent strength by weight solution in acetone. To 467 g of this solution were added initially 0.28 g of dibutyltin(II) benzoate as catalyst, then 7.5 g of N,N-dimethylaminoethanol and finally 480 g of demineralized water. The acetone was then removed under reduced pressure. This provided a storage-stable dispersion having a solids content of 37% by weight. 166 g of IPDI were incorporated by means of a high speed stirrer/dissolver to obtain a water-thinnable two component polyurethane clear coating having an OH:NCO ratio of 1:1.5 and a residual solvent content of <1% by weight, based on the solids content, processible for about 6 hours from preparation. Coats having a wet thickness of 100 μm cured at 100° C. within 30 to 45 min to form shiny bright, hard, elastic and solvent-resistant films.

Example 5

258 g of a polyester having a hydroxyl number of 108 and an acid number of 21 mg of KOH/g (prepared from an acid component consisting of 86% by weight of isophthalic acid and 14% by weight of trimellitic anhydride and an alcohol component consisting of 64% by weight of 1,6-hexanediol, 21% by weight of trimethylolpropane and 15% by weight of 1,6-trimethylhexanediol) were used to prepare a 60 percent strength by weight solution in acetone. To this solution were added initially 22 g of trimethylolpropane (to set a total hydroxyl number of 200), then 0.28 g of dibutyltin(II) benzoate as catalyst, followed by 8.6 g of N,N-dimethylaminoethanol and finally 510 g of demineralized water. The acetone was then removed under reduced pressure. This provided a storage-stable binder dispersion having a solids content of 35% by weight. 166 g of IPDI were incorporated by means of a high speed stirrer/dissolver to obtain a water-thinnable two component polyurethane clear coating having an OH:NCO ratio of 1:1.5 and a residual solvent content of <1% by weight, based on the solids content, processible for about 6 hours from preparation. Coats having a wet thickness of 100 μm cured at 100° C. within 30 to 45 min to shiny bright, hard, elastic and solvent-resistant films.

Obviously, numerous modifications and variations of the present invention are possible in light of the above teachings. It is therefore to be understood that within the scope of the appended claims, the invention may be practiced otherwise than as specifically described herein.

This application is based on German Patent Application No. 196 44 044.0 filed Oct. 31, 1996 and incorporated herein by reference in its entirety.

What is claimed as new and desired to be secured by Letters Patent of the United States is:

1. A composition, comprising:
    (A) an aqueous colloidal or molecular dipersion of at least one organic polyhydroxy compound, and
    (B) an isocyanate consisting essentially of at least one unblocked monomeric diisocyanate dispersed in the dispersion,
    wherein the ratio of the hydroxyl groups in the polyhydroxy compound to the isocyanate groups in the diisocyanate is 0.5:1 to 5:1.

2. The composition of claim 1, having a solids content of 35 to 60 percent by weight, a water content of 40 to 65 percent by weight, a viscosity at 23° C. of 10 to 1000 mPa.s and a pH of 6 to 9.

3. The composition of claim 1, having an organic solvent content of less than 1% by weight, based on the solids content.

4. The composition of claim 1, having an organic solvent content of less than 10% by weight, based on the solids content.

5. The composition of claim 1, wherein the polyhydroxy compound is an addition-polymerization, polycondensation or poly-addition resin having a number-average molecular weight of 1000 to 100,000.

6. The composition of claim 1, wherein the hydroxyl number of the polyhydroxy compound is 50 to 300 mg of KOH/g.

7. The composition of claim 1, wherein the hydroxyl number of the polyhydroxy compound is 100 to 200 mg of KOH/g.

8. The composition of claim 1, wherein the isocyanate groups of the diisocyanate are bonded to an aliphatic and/or cycloaliphatic group.

9. The composition of claim 1, wherein the diisocyanate is isophorone diisocyanate.

10. The composition of claim 1, further comprising at least one adduct comprising at least one urethane group, wherein the urethane group is produced by the reaction of a hydroxyl group of the polyhydroxy compound with an isocyanate group of the diisocyanate.

11. The composition of claim 1, having a solids content of 35 to 60 percent by weight, a water content of 40 to 65 percent by weight, a viscosity at 23° C. of 10 to 1000 maP.s immediately after combining the diisocyanate and the dispersion, and a pH of 6 to 9.

12. The composition of claim 1, comprising less than 1% by weight of an organic solvent, based on the solids content.

13. The composition of claim 1, comprising less than 10% by weight of an organic solvent, based on the solids content.

14. A process of preparing a coating composition according to claim 1, which comprises combining:
    (A) an aqueous dispersion of at least one organic polyhydroxy compound, and
    (B) an isocyanate consisting essentially of at least one unblocked monomeric diisocyanate,
    wherein the ratio of the hydroxyl groups in the polyhydroxy compound to the isocyanate groups in the diisocyanate is 0.5:1 to 5:1.

15. The process of claim 14, wherein the aqueous dispersion of the polyhydroxy compound, the diisocyanate, or both, has an organic solvent content of less than 1% by weight.

16. The process of claim 14, wherein the aqueous dispersion of the polyhydroxy compound, the diisocyanate, or both, has an organic solvent content of less than 10% by weight.

17. A process of coating, comprising applying the composition of claim 1 to a substrate.

18. The process of claim 17, wherein the substrate is wood, metal or plastic.

19. The composition of claim 1, wherein said aqueous dispersion is a colloidal dispersion wherein said organic polyhydroxy compound has an average particle size of from 10 to 100 nm.

20. The composition of claim 1, wherein said aqueous dispersion is a molecular dispersion wherein said organic polyhydroxy compound has an average particle size of <10 nm.

21. The composition of claim 1, wherein said unblocked monomeric diisocyanate has a particle size of the same order of magnitude as said polyhydroxy compound.

22. The composition of claim 19, wherein said unblocked monomeric diisocyanate has a particle size of the same order of magnitude as said polyhydroxy compound.

23. The composition of claim 20, wherein said unblocked monomeric diisocyanate has a particle size of the same order of magnitude as said polyhydroxy compound.

24. The composition of claim 1, consisting essentially of said aqueous dispersion.

* * * * *